United States Patent [19]

Sinclair et al.

[11] 4,385,164

[45] May 24, 1983

[54] BLOCK COPOLYMER DISPERSION STABILIZER AND AQUEOUS DISPERSION POLYMERIZATION THEREWITH

[75] Inventors: Richard G. Sinclair; David L. Berry, both of Columbus; George E. Cremeans, Groveport; Richard A. Markle, Columbus; Wesley M. Germon, Jr., Cuyahoga Falls, all of Ohio

[73] Assignee: The Goodyear Tire & Rubber Company, Akron, Ohio

[21] Appl. No.: 92,595

[22] Filed: Nov. 8, 1979

Related U.S. Application Data

[63] Continuation of Ser. No. 895,906, Apr. 13, 1978, abandoned, which is a continuation of Ser. No. 665,657, Mar. 10, 1976, abandoned.

[51] Int. Cl.$^3$ .............................................. C08F 2/20
[52] U.S. Cl. ............................ 526/201; 525/185; 525/242
[58] Field of Search ................................ 526/201

[56] References Cited

U.S. PATENT DOCUMENTS

| | | | |
|---|---|---|---|
| 3,053,801 | 9/1962 | Bingham | 526/201 |
| 3,948,866 | 4/1976 | Pennewiss | 526/201 |
| 4,026,962 | 5/1977 | Lambla | 526/201 |
| 4,070,348 | 1/1978 | Kraemer | 526/261 |

*Primary Examiner*—C. A. Henderson
*Attorney, Agent, or Firm*—J. Y. Clowney; D. O. Nickey

[57] ABSTRACT

A block copolymer dispersion stabilizer for use in the aqueous dispersion polymerization of an ethylenically unsaturated monomer comprises at least two blocks linked by chemical valences. At least one of the blocks is hydrophilic (water soluble) and at least another of said blocks is hydrophobic (water insoluble). The hydrophobic block can contain a plurality of similar or dissimilar pendent groups having chemically reactive functionality. Examples of such groups are epoxy groups and ethylenically unsaturated bonds. An aqueous dispersion polymerization process utilizes water as the dispersion medium, a free-radical polymerization catalyst, a block copolymer dispersion stabilizer comprising at least two blocks linked by chemical valences wherein at least one of said blocks is hydrophilic and at least another of said blocks is hydrophobic and can contain a plurality of similar or dissimilar pendent groups having chemically reactive functionality, and a polymerizable ethylenically unsaturated monomer such as, for example, styrene, vinyl acetate, acrylonitrile, methyl methacrylate, butadiene, styrenebutadiene mixtures, and acrylonitrile-styrene mixtures.

11 Claims, No Drawings

BLOCK COPOLYMER DISPERSION STABILIZER AND AQUEOUS DISPERSION POLYMERIZATION THEREWITH

This is a continuation, of application Ser. No. 895,906 filed Apr. 13, 1978, now abandoned which is a continuation of application Ser. No. 665,657, filed Mar. 10, 1976, now abandoned.

BACKGROUND OF THE INVENTION

This invention relates to a block copolymer dispersion stabilizer for use in the aqueous dispersion polymerization of an ethylenically unsaturated monomer and to a process wherein an ethylenically unsaturated monomer is polymerized in aqueous media in the presence of said block copolymer dispersion stabilizer.

Many polymerization processes are used in the formation of synthetic fibers. Most step-growth polymerization reactions are carried out in homogeneous systems by simple combination of two or more monomers in the melt, in the absence of solvent, i.e., bulk polymerization. The principal advantage of a bulk polymerization is that the product obtained is essentially free of diluent or impurities and can be used directly. A disadvantage of a bulk polymerization reaction is that it is difficult to control the reaction temperature.

A wide variety of polymerization methods are used in the preparation of chain-growth polymers. The radical chain-growth polymerization of olefin monomers, for example, can be conducted in a number of different types of reaction systems, including bulk polymerization, solution polymerization, suspension polymerization, emulsion polymerization, and non-aqueous dispersion polymerization. Each of these systems has certain advantages and disadvantages.

Bulk polymerization is the direct conversion of liquid monomer to polymer in a reaction system in which the polymer remains soluble in its own monomer. As noted above, bulk polymerization systems are free from diluents but the reaction temperature is difficult to control.

In solution polymerization, a solvent is used which is capable of dissolving the monomer, the polymer, and the polymerization initiator. Diluting the monomer with a solvent causes a direct reduction in the rate of polymerization and in the viscosity of the product mixture at a given degree of conversion. These characteristics plus the ability of the solvent to act as an inert heat-transfer medium substantially solves the heat-dissipation problem encountered in bulk polymerization. A disadvantage of solution polymerization, however, is that the solvent, unless carefully selected, may show some reactivity with the active species of the polymerization reaction and undergo chain-transfer reactions. A further disadvantage, not present in bulk polymerization, is that the solvent must be removed at the end of the polymerization to isolate the solid polymer. If the solvent is an organic solvent, care must be exercised in its removal in order to avoid polluting the biosphere with undesirable contaminants. Also, the use of organic solvents adds to the cost of the process.

In suspension polymerization, the initiator is dissolved in the monomer, the monomer is dispersed in water, and a dispersing agent is incorporated to stabilize the suspension formed. All suspension polymerization processes use some type of suspending or surface-active material to keep the monomer globules dispersed throughout the reaction in order to avoid coalescence and agglomeration of the polymer. Not only does the suspension stabilizer affect the particle size and shape, but also the clarity, transparency, and film-forming properties of the resultant polymer. A variety of dispersing agents including water-insoluble, finely divided, inorganic materials, and organic materials, depending upon the monomer to be polymerized have been used as dispersing agents. Thus, for example, talc, barium, calcium and magnesium carbonates, silicates, phosphates and sulfates, as well as poly(vinyl alcohol), tragacanth gum, salts of styrene-maleic anhydride copolymers, vinyl acetate-maleic anhydride copolymers and their salts, starch, gelatin, pectin, alginates, methyl cellulose, carboxy-methylcellulose, bentonite, limestone and alumina have been used as suspending agents. A major advantage of suspension polymerization is that the polymeric products are obtained in the form of small beads which are easily filtered, washed, and dried. For reasons of cost and nonreactivity, water is a much more desirable diluent and heat-transfer medium than organic solvents. There is no problem in polluting the biosphere when removing water from the product. In suspension polymerization, there is a possibility that the suspension stabilizer system used may have impurities which retard or inhibit the polymerization. The suspension stabilizer must be carefully chosen so as not to adversely affect the resin properties such as clarity, heat stability, and electrical behavior. Some suspension stabilizers may result in a foam problem due to their action in lowering the surface tension of the aqueous phase. A defoamer can be utilized to avoid the problem of foaming, but it too may adversely affect the properties of the resultant polymer as well as add to the cost. Thus, suspension polymerization has a number of disadvantages in its commercial application.

An emulsion polymerization process is considered to be a three-phase reaction system consisting of large droplets of the monomer, the aqueous water phase containing the dissolved initiator, and the colloidal particles of monomer-swollen polymer. The monomer droplets and the swollen monomer-polymer particles are stabilized in the aqueous medium by absorbed surface-active agents incorporated into the reaction mixture before the start of the polymerization. The initiators are usually water soluble. Inorganic peroxides are quite often used as initiators. Hydrogen peroxide and ammonium peroxysulfate are specific examples of such inorganic peroxide compounds. Frequently a reducing agent is used in conjunction with a peroxide compound which combination is referred to as a redox initiator system. Because an inherent characteristic of this method of polymerization is the formation of unusually high molecular weight polymers, the use of a chain-transfer agent, termed a modifier, is often required to limit the molecular weight of the polymer without reducing the rate of polymerization reaction. While the emulsion polymerization process has the economical advantage of using water as the emulsion base, the emulsifier may give rise to problems in obtaining a solid polymer product free from undesirable contaminants. If a chain-transfer agent is required, some of the economical advantage of using water as the base is lost in the cost of the chain-transfer agent.

In non-aqueous dispersion polymerization, the reaction is effected by polymerizing a monomer in an organic liquid in which the resulting polymer is insoluble, using a dispersion stabilizer to stabilize the resulting particles of insoluble polymer in the organic liquid. A review of the published literature relating to non-aqueous dispersions and dispersion stabilizers appears in "Nonaqueous Dispersions as Vehicles for Polymer Coatings" by R. Dowbenko and D. P. Hart, Ind. Eng. Chem. Prod. Res. Develop., Vol. 12, No. 1, pp. 14–28, 1973. Since non-aqueous dispersion polymerization does not embody the process of the present invention, a detailed discussion of non-aqueous dispersion polymerization will not be presented here. While non-aqueous dispersion polymerization has a number of advantages particularly where the resulting polymer dispersion is to be used without removing the organic dispersing medium, the process has certain economical and ecological disadvantages when a free-flowing, dry, particulate powder is the desired product. Unless care has been exercised to remove any coalescing solvent prior to drying the polymer, there is a tendency for the polymer particles to agglomerate and become fused during the end of the drying process.

U.S. Pat. No. 3,580,880 teaches making amphipathic stabilizers and using them as dispersion stabilizers in either aqueous or non-aqueous polymerization processes. However, the dispersion stabilizers so obtained contain at least 25% by weight of components solvatable by a lipophilic liquid, such as, for example, aliphatic and aromatic hydrocarbons and at least 25% by weight of components solvatable by a hydrophilic liquid, such as, for example, water and strongly hydrogen bonded organic liquids which are completely miscible with water, e.g., ethylene glycol, methyl alcohol and ethyl alcohol.

In the aqueous dispersion process of the present invention, the hydrophilic or water-soluble block of the dispersion stabilizer comprises about 50 to about 97 percent, preferably about 80 to about 90 percent by weight of the stabilizer and the hydrophobic or water-insoluble block of the dispersion stabilizer comprises about 3 to about 50, preferably about 10 to about 20 percent by weight of the stabilizer in order to effect optimum dispersion in water of the polymer obtained in the main polymerization reaction. Also, the stabilizer disclosed in said patent appears to be macromonomers that are randomly copolymerized with "surface" attachment of the stabilizer to the main polymer. To the contrary, the block copolymers of the present invention comprise hydrophilic and hydrophobic blocks, the hydrophobic blocks having a plurality of pendent groups such as ethylenically unsaturated bonds and/or epoxy groups for attachment of the stabilizer to the main polymer by covalent bonds. Still further, the dispersion stabilizer in the patent is used in the main polymerization reaction as a solution of the stabilizer in an organic liquid. The stabilizer of the present invention is prepared in an organic liquid but is dried so that the organic liquid is removed before it is used as a dispersion in the main polymerization reaction. Thus, the present invention effects an aqueous dispersion polymerization reaction in the absence of an organic diluent capable of polluting the atmosphere if not properly contained.

SUMMARY OF THE INVENTION

In accordance with the present invention, a block copolymer dispersion stabilizer for use in the aqueous dispersion polymerization of an ethylenically unsaturated monomer is provided together with a process for polymerizing an ethylenically unsaturated monomer in aqueous media, i.e., water, in the presence of said block copolymer stabilizer. The dispersion stabilizer comprises a copolymer containing two or more blocks linked together by chemical valences at least one of which blocks is hydrophilic, i.e., water soluble and at least another of which blocks is hydrophobic, i.e. water insoluble and is compatible with the ethylenically unsaturated monomer which subsequently is polymerized in the presence of the dispersion stabilizer. In a preferred embodiment of the invention, a dispersion stabilizer is prepared in a non-aqueous medium, such as, for example, benzene. The dispersion stabilizer is then separated from the non-aqueous medium and dried to remove all volatile diluents. The dried dispersion stabilizer is then admixed with an ethylenically unsaturated monomer and the polymerization initiator. The admixture thus formed is copolymerized to produce a polymerizate comprising an aqueous dispersion of polymer. The polymer dispersions of the present invention may have concentrations varying from 1 to 60% or higher solids content. Preferably the dispersions have a solid content of between 25 and 50%. The polymer dispersions may be used as obtained, or dried, or diluted to any desired concentration. Depending upon the monomer or monomers used in the process, the main polymer may be used for coating and impregnation of various substrates such as textile, fabrics, paper, paperboard, leather, wood, metal, ceramics, concrete, bricks, stones, plaster, linoleum, asphalt tile, asbestos, etc. The polymer may be further formulated to include fillers, plasticizers, cross-linking agents, pigments, polymeric or resinous materials, etc. When used in plastisol compositions by dispersing the polymer in a plasticizer, the resultant polymer product may be calendered or extrusion-moulded to form sheets. The polymers made in accordance with this invention are useful as synthetic rubbers.

The process of the present invention has a number of important advantages over the prior art processes. As indicated hereinabove, it is difficult to control the reaction temperature in bulk polymerization processes. There is no problem in controlling the reaction temperature in the aqueous dispersion polymerization process of the present invention. In solution polymerization processes and in non-aqueous dispersion polymerization processes the organic solvent, unless carefully selected, may react with a monomer used in the process or may cause undesired agglomeration of the resultant product. In addition, the use of an organic solvent adds to the cost of the process and may give rise to contamination of the atmosphere if adequate protective measures are not employed in its use. Since the process of the present invention does not use an organic diluent as a polymerization medium, the process does not give rise to problems of contamination of the biosphere. In the prior art suspension and emulsion polymerization processes, various soaps, surfactants, and inorganic suspending agents have been used in conjunction with polymerization reactions using aqueous media. These conventional wetting agents normally limit the usefulness of the polymers in such ways as their heat stability, color, electrical insulation qualities, weatherability and water sensitivity. In the process of the present invention, the dispersion stabilizer, by virtue of the fact that it, per se, is a polymerized organic compound, will not be a volatile pollutant. Since the polymeric dispersion stabilizer is nonionic, it does not adversely affect the color of the resultant polymer.

The process of the present invention has other advantages such as better particle size control and the stabilizer is not volatile and also non-extractable in the aqueous media. Low viscosity allows a large industrial polymerization to be processed quite easily with regard to management of the heat of reaction, transfer of the polymerizate from one point to another in the process, and the ease in which polymer products can be isolated from the reaction mass. The high-solids content is desirable in order to obtain as much product as possible with the least expenditure of energy. A still further advantage of the process of the present invention is in its simplicity and cleanliness. The essential materials consist of water, monomer or monomers, initiator and dispersion stabilizer.

DETAILED DESCRIPTION OF THE INVENTION

The polymerizable monomer which is polymerized in the process of the invention can be selected from a wide variety of polymerizable ethylenically unsaturated monomers including acrylic and vinyl monomers such as the vinyl esters of fatty acids having from 1 to 18 carbon atoms including vinyl acetate, vinyl propionate, vinyl butyrate, vinyl laurate, vinyl oleate and vinyl stearate. Esters of acrylic acid or of methacrylic acid with alcohols having from 1 to 18 carbon atoms can likewise be employed. Examples include methyl acrylate or methacrylate, ethyl acrylate or methacrylate, propyl acrylate or methacrylate, isopropyl acrylate or methacrylate, the various butyl acrylates or methacrylates, cyclohexyl acrylate or methacrylate, benzyl acrylate or methacrylate, phenyl acrylate or methacrylate, n-hexyl, 2-ethylhexyl, n-octyl, t-octyl, dodecyl, hexadecyl, or octadecyl acrylates or methacrylates. Other monomers which can be polymerized in accordance with the invention include acrylonitrile, methacrylonitrile, acrylamide, methacrylamide, styrene, α-methyl styrene, butadiene, isoprene, vinyl toluenes, acrylic acid, acrylic acid anhydride, methacrylic acid, methacrylic acid anhydride, maleic anhydride, fumaric acid, itaconic acid, crotonoic acid, allyl acetate, glycidyl methacrylate, t-butylaminoethyl methacrylate, hydroxyalkyl acrylates or methacrylates, such as β-hydroxyethyl methacrylate, β-hydroxypropyl methacrylate, β-hydroxyethyl vinyl ether, β-hydroxyethyl vinyl sulfide, vinyl pyrrolidone, N,N-dimethyl-aminoethyl methacrylate, ethylene, propylene, vinyl chloride, vinyl fluoride, vinylidene chloride, vinylidene fluoride, hexafluoropropylene, chlorotrifluoroethylene and tetrafluoroethylene. It should be understood that mixtures of monomers and their copolymers can also be employed. The preferred monomers for use in accordance with the invention are the alkyl acrylates and methacrylates, vinyl acetate, acrylonitrile, butadiene, isoprene, styrene, t-butyl styrene, and mixtures of styrene with butadiene and styrene with acrylonitrile. Most preferred among these monomers, especially when the end use of the polymer is in automotive coatings is methyl methacrylate or mixtures containing a major amount of methyl methacrylate and a minor amount of a flexibilizing monomer such as butyl acrylate, ethyl acrylate, etc. Most preferred among the monomers when the end use is in synthetic rubber is butadiene, styrene, and isoprene.

The block copolymer dispersion stabilizer in accordance with the invention is selected from a variety of polymers containing at least two blocks linked by chemical valences wherein at least one of said blocks is hydrophilic and at least another of said blocks is hydrophobic and compatible with a polymerizable ethylenically unsaturated monomer. The hydrophobic block contains a plurality of pendent groups such as epoxy groups and components having terminal double bonds capable of further reaction with monomers in the main polymerization.

The hydrophilic or water-soluble block is selected from a variety of water-soluble polymers such as, for example, polymerized acrylic acid, polymerized methacrylic acid, poly(acrylamide), poly(methacrylamide), poly(vinyl pyrrolidone), copolymers of unsaturated amides with not more than 50% of alkyl vinyl ethers, e.g., methyl vinyl ether, water-soluble poly alkylene oxides including poly(ethylene oxide), poly(ethylene oxide)acrylate and methacrylate, methoxy poly(ethylene oxide), methoxy poly(ethylene oxide)acrylate and methacrylate, and copolymers of ethylene oxide with propylene oxide containing at least 40% of ethylene oxide. Polyvinyl alcohol and copolymers of vinyl alcohol with vinyl esters and/or acetals containing at least 75% of vinyl alcohol may also form suitable water-soluble blocks. The hydrophilic block becomes one portion of the dispersion stabilizer molecule via a covalent, chemical bond to the hydrophobic unit.

The hydrophobic block of the dispersion stabilizer is chosen for its water insolubility and compatibility with the ethyleneically unsaturated monomers that are to be polymerized in the subsequent aqueous polymerization process. The water-insoluble block, for example, may be poly(methylmethacrylate), polystyrene, polyacrylonitrile, poly(t-butyl styrene, and poly(vinyl toluene), and copolymers thereof and other similar polymers provided that the block contains pendent vinyl, epoxy, amine, unsaturated, hydroxyl, carboxyl, or other groups having a chemically reactive site to which other functional monomers can be attached to the stabilizer molecule. Epoxide groups may be introduced into the hydrophobic block by copolymerizing the hydrophobic block polymer chain with an epoxide-bearing monomer. Suitable epoxide-bearing monomers are glycidyl acrylate, glycidyl methacrylate and allyl glycidyl ether. Alternatively, polymer chains having a terminal epoxide group may be made by a process as described in U.S. Pat. No. 3,390,206. For example, a carboxyl-terminated polymer chain may be made by polymerizing an ethylenically unsaturated monomer using gamma, gamma'-azo bis(-gamma-cyanovaleric acid) as initiator and thioglycollic acid as a chain transfer agent, the carboxyl group then being reacted with epichlorohydrin.

If a pendent group having a terminal double bond is desired, a pendent epoxide ring provided in the stabilizer may be reacted with an ethylenically unsaturated acid, e.g., acrylic or methacrylic acid to introduce into the stabilizer molecule a double bond capable of copolymerizing with monomer from which the main polymer is formed during the aqueous dispersion polymerization process. Carbon to carbon double bonds may be incorporated in the backbone as attachment sites by using isoprene comonomer in the hydrophobic block.

The hydrophilic or water-soluble block of the dispersion stabilizer comprises about 50 to about 97 percent by weight of the stabilizer. The hydrophobic or water-insoluble block of the dispersion stabilizer comprises about 3 to about 50 percent by weight of the stabilizer. The stabilizer preferably contains about 80 to about 90 percent by weight of the hydrophilic block and about 10 to about 20 percent by weight of the hydrophobic block. If the dispersion stabilizer contains less than about 50 percent by weight of the hydrophilic or more than about 50 percent by weight of the hydrophobic block, the dispersion stabilizer is either insoluble, non-dispersible in water, or promotes an undesirable water-in-oil emulsion.

The dispersion stabilizer provides within the block copolymer one component, a hydrophobic block, which is thought to chemically bond through pendent groups, e.g., double bonds, epoxy groups, etc. with the disperse polymer particles and another component, a hydrophilic block, which provides a stabilizing barrier around the polymer particles. The association between the disperse particles and the stabilizer could also be a mass-dependent force. For example, in the presence of water the pendent groups of the hydrophobic block are in a collapsed or coiled state and in this configuration they provide a mass-dependent associative force between the stabilizer and the disperse polymer.

In certain instances the mass-dependent force between the stabilizer and the disperse polymer may be supplemented by strong forces generated between certain types of polar groups. For example, if the disperse polymer is suitably polar and the stabilizer contains complementary polar groups, then in the presence of water the mass-dependent associative force between the stabilizer and the disperse polymer may be supplemented by specific polar interaction between polar groups in the stabilizer and complementary groups in the disperse polymer.

While we do not wish to be bound by any theory, we believe that the dispersion stabilizer block copolymers of the invention allow polymerization in aqueous media to occur with the formation of small hydrophobic polymer particles attached to the hydrophobic block of the stabilizer molecules. The hydrophilic portions of the stabilizer, in turn, extend into the aqueous phase and stabilize the dispersion in the form of discrete, small particles. The polymerizing monomers attach by chemical bonds and solubility forces to the lypophilic portion of the stabilizer, which also prevents the growing polymer particles from agglomerating to intractable masses since the hydrophilic block of the stabilizer maintains a solubilizing sheath around the individual particles. The polymerizate becomes, in effect, a solubilized, but entropically-stabilized collection of discrete polymer particles. Since the individual particles do not agglomerate and interact only slightly, if at all, the polymerizate can contain a high solids content while simultaneously maintaining a low viscosity.

The dispersion stabilizer in accordance with the present invention can be prepared according to known block polymerization techniques. The hydrophilic block can be prepared and then copolymerized with the hydrophobic block which is prepared in situ or the hydrophobic block can be prepared and then copolymerized with the hydrophilic block which is prepared in situ. Alternatively, the hydrophilic and hydrophobic blocks can be separately prepared and then copolymerized under conditions to obtain a block copolymer wherein pendent groups having reactive functionality are attached to the hydrophobic block. In any event, the stabilizer is prepared under conditions to obtain a block copolymer wherein a plurality of pendent groups having reactive functionality are distributed along an essentially hydrophobic polymeric backbone. By "reactive functionality", we mean that the pendent groups are capable of further reaction with functionally reactive monomers, and are exemplified by components having double bonds, epoxy groups, carboxyl groups, hydroxyl groups, amine groups, etc. When the pendent group is an epoxy group, it can be capped with an ethylenically unsaturated acid such as, for example, acrylic or methacrylic acid to form pendent double bonds. According to one embodiment, a hydrophilic block polymer having a terminal double bond is formed by reacting a poly(alkylene oxide) with methacrylyl chloride in a non-aqueous medium such as, for example, benzene under conditions to give a poly(alkylene oxide)methacrylate. The hydrophilic block polymer thus obtained is then free-radically polymerized in a non-aqueous medium such as, for example, benzene with a hydrophobic block polymer obtained by the in situ polymerization of an ethylenically unsaturated monomer such as glycidyl acrylate or glycidyl methacrylate. The copolymer thus formed comprises a hydrophobic block containing a plurality of pendent epoxy groups. While the copolymer thus formed could be separated from the non-aqueous medium, dried and then used in the aqueous dispersion polymerization of an ethylenically unsaturated monomer such as, for example, vinyl acetate, acrylonitrile, methyl methacrylate, butadiene and styrene, a preferred embodiment of the invention comprises the conversion of at least some of the epoxy pendent groups to pendent double bonds. Thus, the copolymer with pendent epoxy groups is further free-radically polymerized with an ethylenically unsaturated acid such as acrylic or methacrylic acid whereby some or all of the pendent epoxy groups are converted to pendent double bonds in the stabilizer. The double bonds are thus available to allow grafting of other monomers during the subsequent aqueous dispersion polymerization process. The dispersion stabilizer is then separated from the non-aqueous solution and then dried by known procedures such as spray drying, vacuum drying, drum drying, rotary vacuum evaporation, freeze drying, and the like. The dried dispersion stabilizer is then used in the aqueous dispersion polymerization process.

The block copolymer dispersion stabilizer is prepared according to known polymerization procedures utilizing heat and/or catalysts and various solvents. The most readily adaptable system for use in the present invention is that of free-radical type polymerization. This type of polymerization employs a free-radical catalyst of the azo or peroxygen type. Examples of such catalysts include benzoyl peroxide, lauroyl peroxide, acetyl peroxide, cumene hydroperoxide, azobisisobutyronitrile, dimethyl azobisisobutyronitrile and 1,4-diazobiscyclo(2.2.2)octane. Any of the free-radical type catalysts which are soluble in the monomer or the organic liquid solvent, e.g., aliphatic or aromatic hydrocarbon can be employed. More than one free-radical catalyst can be employed. Free-radical catalysts which are activated by other compounds including amines such as, for example, triethylenetetramine and various salts such as, for example, cobalt naphthenate can also be used. In general, any free-radical catalyst that can be used for bulk or solution polymerization of the monomers herein enumerated can be employed in the present invention. The catalyst is used in normal catalytic amounts. In general, the catalyst is used in amounts of about 0.1 to about 10 percent by weight based on the weight of the monomer or monomers. The amount employed may depend upon the method of addition and the molecular weight desired in the block copolymer dispersion stabilizer. Of course, the catalyst can be added all at once or incrementally during the polymerization reaction. In general, the molecular weight of the dispersion stabilizer may be of a wide range, but preferably it is from one-tenth to ten times that of the main polymer to be held in dispersion. The weight average molecular weight of the dispersion stabilizer used in the process of the present invention is usually within the range of about 1,000 to $10^6$ or more. Preferably, however, the molecular weight of the hydrophilic block is at least 4,000 and in the range of 0.1 to ten times the molecular weight of the hydrophobic block, which is at least 1,500 and preferably at least 10,000.

The amount of the dispersion stabilizer utilized in the polymerization process of the invention will vary with the size and specific surface area of the disperse polymer. In general, the proportion of stabilizer required is from 0.1 to 10 percent of the weight of the monomer or monomers in the main polymerization process. Smaller particles require more dispersion stabilizer than larger particles. Thus, particles of about 0.1 micron in size may require from 5 to 10 percent of the dispersion stabilizer whereas particles of about 1.0 micron in size may require only about 0.5 to 2.0 percent of the stabilizer. The main polymer obtained in the process of the invention may comprise discrete particles having sizes of 10 microns or less, and preferably have sizes of about 0.1 to 2.0 microns. The weight average molecular weight of the main polymer is generally within the range of about 40,000 to about 200,000 and a number average molecular weight within the range of about 10,000 to 40,000.

The aqueous dispersion polymerization is carried out according to conventional polymerization techniques utilizing heat and/or catalysts in the absence of oxygen. Some polymerization reactions are conducted at temperatures within the range of about 50° to 80° C. Higher temperatures can be used but if the temperature exceeds the boiling point of water, the system must be under positive pressure. The exact temperature employed will depend to some extent upon the monomer or monomers being polymerized and the initiator being used. Generally, the temperature is controlled to avoid too rapid a polymerization and to avoid such a high temperature as to preclude the grafting of a portion of the monomer upon the dispersing stabilizer. In general, the polymerization is carried to as high a conversion as is practical in a suitable period of time. Conversions of about 90 to 100 percent can be obtained in a period of one-half hour to 48 hours depending upon the particular monomer or monomers, initiators and proportions.

In accordance with the aqueous dispersion process of the present invention, a portion of the dry stabilizer, a portion of the monomer or monomers to be polymerized and a portion of the initiator are added to the water in a reaction vessel in which polymerization is to be effected. These constituents can be added to the reaction vessel in any order or simultaneously. After holding the contents of the reaction vessel at a polymerization temperature for a short period of time to effect the initiation of the formation of a fine particle-size dispersion (a procedure referred to as seeding), the remainder of the dispersion stabilizer, monomer or monomers and initiator can then be added to the reaction vessel either incrementally or continuously, preferably at a uniform rate, over an extended period of time. While seeding may be effected in a period of about 10 to 30 minutes, the total polymerization time may cover a period of 1 to 48 hours or more depending upon the degree of polymerization to be effected.

On the other hand, the aqueous dispersion process of the invention may be conducted in a manner wherein all of the dry stabilizer, all of the monomer or monomers to be polymerized, and all of the initiator are added to the water in the reaction vessel in which the polymerization is to be conducted. The constituents can be added to the vessel in any order or simultaneously. Again, the total polymerization time may cover a short period of time, such as one hour, or may be of a lengthy nature, all depending upon the particular stabilizer, monomers, and initiators employed as well as the polymerization conditions.

The catalyst or initiator which is employed depends upon its decomposition rate at the reaction temperature of the polymerization and the particular monomer or monomers being polymerized. In the high-pressure, free-radical-initiated polymerization of ethylene, a wide range of reaction temperatures is used, depending upon the process and density of the polymer desired. If temperatures of 130° to 260° C. are used the reactor residence times are short. The larger number of peroxide initiators used with ethylene polymerization range in activity from diisobutyryl peroxide to di-t-butyl peroxide. Processes for the manufacture of polystyrene in aqueous systems operate primarily in temperature ranges of 80° to 120° C. with finishing temperatures up to about 135° C. Initiators used in the temperature range of 80° to 120° C. may range in activity from dibenzoyl peroxide to di-t-butyl peroxide and t-butyl hydroperoxide. Vinyl chloride polymers are manufactured commercially at relatively low temperatures, ranging from 45° to 60° C. for the homopolymer and up to about 85° C. for copolymers with vinyl acetate. For low-temperature systems, peroxides such as diisopropyl peroxydicarbonate and t-butyl peroxypivalate are used. In some instances, hydrogen peroxide and the persulfates such as, for example, ammonium peroxydisulfate and potassium peroxydisulfate are used because of their water solubility. Some t-butyl hydroperoxide and cumene hydroperoxide are also used, particularly for finishing the polymerization. Other commonly used free-radical initiators are diacetyl peroxide, azobisisobutyronitrile, di(2,4-dichlorobenzoyl)peroxide, di(p-chlorobenzoyl)peroxide, dipropionyl peroxide, dilauroyl peroxide, dipelargonyl peroxide, diisobutyryl peroxide, paramenthane hydroperoxide, 2,5-dimethyl-2,5-dihydroperoxyhexane, and diisopropylbenzene hydroperoxide. The rates of radical formation by the peroxy initiators such as hydrogen peroxide and the persulfates are usually enhanced by the addition of an activator such as an inorganic, water-soluble reducing agent to the reaction mixture. Sodium formaldehyde sulfoxylate and ferrous sulfate ($FeSO_4.7H_2O$) are examples of such activating reducing agents used with the persulfates. The combination of peroxide and a reducing agent is termed a redox initiator system.

The practice of the invention is further illustrated by reference to the following examples which are intended to be representative rather than restrictive of the scope of this invention.

PREPARATION OF DISPERSION STABILIZER

A. Preparation of methoxy-poly(ethylene oxide)methacrylate

A 2,000 ml., three-necked reaction vessel equipped with a condenser, a magnetic stirrer, an argon purge, a thermometer and a Dean-Stark distillation tube is charged with 195.0 g. of vacuum-dried methoxy-poly(ethylene oxide) having a molecular weight of 5,000 dissolved in 600 ml. of calcium hydride-dried benzene. Under a positive flow of argon, 10 ml. of solution is distilled off, removing all traces of cloudiness. 4.1 ml. of calcium hydride-dried pyridine is then added and another 10 ml. of solution is removed by distillation. 4.0 ml. of methacrylyl chloride dissolved in 50 ml. of calcium hydride-dried benzene is then added slowly to the reaction vessel. The resulting solution is refluxed for 1½ hours. After cooling, the solution is passed through fluted filter paper to remove pyridinium hydrochloride precipitate.

B. Preparation of block copolymer having a hydrophilic block and a hydrophobic block having reactive functionality pendent groups A 1,000 ml., three-necked reaction vessel equipped with a condenser, a magnetic stirrer, an argon purge, a thermometer, a gas outlet through a water-filled test tube and a constant rate addition funnel is charged with 1 ml. of glycidyl methacrylate, 200 ml. of benzene, 3.7 ml. of t-butyl styrene and 0.15 g. of azobisisobutyronitrile. To this mixture is added a few (5-10 ml.) milliliters of a benzene solution of methoxy poly(ethylene oxide)-methacrylate (obtained from "A" above) and azobisisobutyronitrile through the addition funnel. In all, the addition funnel contains 93.9 ml of a benzene solution containing 195 g. of methoxy-poly(ethylene oxide)methacrylate in 718 ml of benzene, and 0.077 g. of azobisisobutyronitrile. The contents of the reaction vessel are refluxed for about 15 minutes whereupon some block copolymer is formed between the t-butyl styrene and the methoxy poly(ethylene oxide)methacrylate. This in effect is a seeding of the copolymer and precedes full-scale copolymerization. Thereafter, the remainder of the solution in the addition funnel is added to the reaction vessel under refluxing conditions over a period of one hour. The solution in the reaction vessel is then refluxed for an additional period of 24 hours. The block copolymer thus obtained comprises 85% by weight of a hydrophilic block and 15% by weight of a hydrophobic block, the latter block containing pendent epoxy groups.

To the cooled contents of the reaction vessel without any separation are then added 0.347 g. of hydroquinone, 0.177 g. of 1,4-diazabicyclo-(2.2.2)octane and 0.63 ml. of methacrylic acid. The contents of the reaction vessel are then refluxed for 23 hours. The block copolymer thus obtained comprises 85% by weight of a hydrophilic block and 15% by weight of a hydrophobic block, the latter containing pendent double bonds. The double bonds are the result of capping the epoxy groups. Depending upon the amount of methacrylic acid employed, the hydrophobic block may contain some pendent epoxy groups as well as pendent double bonds. The copolymer solution thus obtained is freeze-dried to obtain the desired, dry block copolymer for subsequent use as a dispersion stabilizer in the aqueous dispersion polymerization process of the invention. The block copolymer thus obtained has a weight average molecular weight of 13,930 and a number average molecular weight of 10,460.

EXAMPLE 1

Aqueous dispersion polymerization of vinyl acetate

A 6½ oz. soft drink bottle is charged with 20 ml. of water, 20 ml. of vinyl acetate containing 0.50 g. of the dispersion stabilizer obtained in "B" above, 1 ml. of water containing 0.21 g. of sodium formaldehyde sulfoxylate and 0.006 g. of ferrous sulfate ($FeSO_4.7H_2O$). The bottle is capped with a metal lid through which a small hole has been drilled, sealed with a disk of butyl rubber, a nitrile disk and a "Teflon" disk. 0.22 ml. of para-methane hydroperoxide is injected through the seal into the bottle. The bottle is placed in a shaker bath at approximately 29° C. After 2 hours, a moderate viscosity, opaque, homogeneous liquid is observed. The liquid contains 53% solids indicating a conversion of 100%. The poly(vinyl acetate) product has a weight average molecular weight of 151,300 and a number average molecular weight of 34,300. The $M_w/M_n = 4.42$.

EXAMPLE 2

Aqueous dispersion polymerization of acrylonitrile

A 500 ml. reaction vessel equipped with a crescent stirrer, a condenser, an argon inlet, and a Claisen adapter with a constant rate addition funnel is charged with 100 ml. of water and 0.653 g. of ferrous sulfate ($FeSO_4.7H_2O$). The funnel contents consisting of 50 ml. of acrylonitrile, 0.89 ml. of para-menthane hydroperoxide and 2.05 g. of the dispersion stabilizer obtained in "B" above are added over a period of 3 hours to the reaction vessel held in an ice bath. Polymer particles are formed early. The mass finally becomes the consistency of paste. On shaking with water, the paste forms a sedimentable suspension.

EXAMPLE 3

Aqueous dispersion polymerization of methyl methacrylate

In a manner analogous to that described in Example 2, the reaction vessel is charged with 100 ml. of water and 0.389 g. of ferrous sulfate ($FeSO_4.7H_2O$). To this solution over a period of 5 hours are added 50 ml. of methyl methacrylate, 0.5 ml of para-menthane hydroperoxide and 2.50 g. of the dispersion stabilizer obtained in "B" above. The poly(methyl methacrylate) product has a weight average molecular weight within the range of 92,000 to 177,000 and a number average molecular weight within the range of 48,400 to 40,000. The $M_w/M_n = 2$ to 4.

EXAMPLE 4

Aqueous dispersion polymerization of butadiene

A 6½ oz. soft drink bottle is charged with 30 ml. of water, 10 g. of butadiene, 0.50 g. of the dispersion stabilizer obtained in "B" above, and 0.4 ml. of paramenthane hydroperoxide. After allowing excess butadiene to boil off, the bottle is capped and placed in a tumble bath at ambient temperature as in Example 1. 1½ ml. of a solution prepared from 1.0 g. of ferrous sulfate ($FeSO_4.7H_2O$) and 2 ml. of water is injected through a septum as in Example 1. After polymerization is allowed to continue overnight (16 hours), the conversion is about 22%. The weight average molecular weight of the poly(butadiene) product is within the range of 92,000 to 177,000. The polymer dispersion is homogeneous and of moderate viscosity. Microscopic examination reveals the presence of small spheres down to the optical limit.

EXAMPLE 5

Aqueous dispersion polymerization of styrene/butadiene (85/15)

In a manner analogous to that described in Example 4, the bottle is charged with 40 ml. of water, 18.7 ml. of styrene, 3.0 g. of butadiene, 1.0 g. of the dispersion stabilizer obtained in "B" above, and 0.22 ml. of paramenthane hydroperoxide. 1.0 ml. of a solution prepared from 0.232 g. of ferrous sulfate ($FeSO_4.7H_2O$) and 2.0 ml. of water is injected through the septum. After polymerization is continued over a period of 2 days (63 hours), the conversion is about 63.3%. The product is a redispersible paste.

EXAMPLE 6

Aqueous dispersion polymerization of acrylonitrile/styrene (85/15)

A 300 ml., three-necked reaction vessel equipped with a crescent stirrer, a constant rate addition funnel and a septum with inlet and outlet needles for a positive argon flow is charged with 80 ml. of water, 0.013 g. of ferrous sulfate ($FeSO_4.7H_2O$) and 0.205 g. of sodium formaldehyde sulfoxylate. The funnel contents consisting of 21.1 ml. of acrylonitrile, 3.3 ml. of styrene and 0.99 g. of dispersion stabilizer obtained in "B" above are added over a period of 2 hours to the reaction vessel held at about 5° C. with cold tap water. The collected 85/15 acrylonitrile/styrene copolymer readily sediments and filters easily yielding a 100% conversion.

C. Preparation of block copolymers having a hydrophilic block and a hydrophobic block having functionality pendent groups A variety of block copolymer dispersion stabilizers were prepared using similar techniques to A and B above. These block copolymers are described in Table C below and are given a number in the extreme lefthand column. In Examples 7, 8 and 9 these stabilizers were employed as indicated in Tables 7, 8 and 9.

EXAMPLE 7

Aqueous Dispersion Polymerization of Styrene/Butadiene (85/15 Percent by weight)

A series of 4-oz. small-mouth bottles, equipped with a sealable cap were employed in these experiments.

The procedure employed consisted of adding 150 grams of water (to equal a total solid recipe of 41 percent), 5 grams of stabilizer which are listed in Table A above, and 0.4 gram of potassium persulfate or $\alpha,\alpha'$-azobis(alpha, gammadimethylvaleronitrile) to each bottle as the aqueous phase. The monomers were added next and consisted of 100 grams of a mixture of 85 percent by weight of styrene and 15 percent by weight of butadiene. Then was added 0.3 gram of a tertiary mercaptan chain transfer agent. The bottles were then charged with nitrogen and capped and permitted to tumble end-over-end in a 125° F. constant temperature bath for the alotted time. The results and amounts of stabilizer are given in the Table 7 below.

TABLE 7

Aqueous Dispersion Polymerization
85% Styrene - 15% Butadiene Copolymer

| Number | Stabilizer (3) | % Stabilizer (4) | Catalyst (5) | Hrs. at 125° F. | Theoretical Solids | % Conversion |
|---|---|---|---|---|---|---|
| 1 | 10 | 5 | (2) | 57 | 40 | 52.5 |
| 2 | 20 | 5 | (1) | 21 | 31 | 74.2 |
| 3 | 20 | 5 | (2) | 21 | 31 | 70.0 |
| 4 | 20 | 10 | (2) | 21 | 32 | 100 |
| 5 | 23 | 10 | (2) | 21 | 32 | 78.7 |
| 6 | 24 | 10 | (1) | 21 | 32 | 93.4 |
| 7 | 42 | 10 | (2) | 26 | 32 | 57.2 |
| 8 | 43 | 10 | (1) | 26 | 32 | 51.6 |
| 9 | 46 | 5 | (1) | 21 | 31 | 59.7 |
| 10 | 7 | 10 | (1) | 48 | 41 | 38.0 |

(1) Potassium persulfate
(2) $\alpha,\alpha'$-Azobis(alpha, gamma-dimethylvaleronitrile)
(3) See Table C above
(4) % by weight of monomer
(5) 0.4 part (weight) per 100 parts monomer

TABLE C

BLOCK COPOLYMER DISPERSION STABILIZERS

| No. | Hydrophilic Block % by weight | Hydrophobic Block % by weight | Hydrophilic Moiety | Block | Reactive Site (4) | Wt. % Ratio Block/Reactive Site |
|---|---|---|---|---|---|---|
| 7 | 60 | 40 | PEG (1) | STY | GMA | 90/10 |
| 10 | 60 | 40 | PEG (1) | STY | GMA/MAA | 90/10 |
| 20 | 85 | 15 | PEG (1) | VT | GMA/MAA | 95/5 |
| 22 | 95 | 5 | PEG (1) | VT | GMA/MAA | 95/5 |
| 23 | 85 | 15 | PEG (1) | TBS | GMA/MAA | 95/5 |
| 24 | 75 | 25 | PEG (1) | VT | GMA/MAA | 97/3 |
| 42 | 65 | 35 | PEG (1) | TBS | GMA | 97/3 |
| 43 | 85 | 15 | PEG (2) | TBS | GMA | 95/5 |
| 46 | 85 | 15 | PMAA | STY (3) | I | 97.5/2.5 |

(1) is $\overline{M}_w = 5000$
(2) is $\overline{M}_w = 2000$
(3) is $\overline{M}_w = 67,000$
(4) Comonomer reactive sites are of incorporating equimolar amounts of given comonomer reactants.

Moiety Code:
PEG = polyethylene glycol
PMMA = polymethacrylic acid
TBS = t-butyl styrene;
I = isoprene
STY = styrene
MAA = methacrylic acid;
GMA = glycidyl methacrylate
VT = p-vinyl toluene

EXAMPLE 8

In this example, the same procedure employed in Example 7 was used except that the monomer mixture polymerized was 75 percent by weight butadiene and 25 percent by weight of styrene. Data therefore are shown in Table 8.

TABLE 8

Aqueous Dispersion Polymerization
85% Styrene - 25% Butadiene Copolymer

| Number | Stabilizer (3) | % Stabilizer (4) | Catalyst (5) | Hrs. at 125° F. | Theoretical Solids | % Conversion |
|---|---|---|---|---|---|---|
| 1 | 10 | 5 | (1) | 33 | 40 | 24.0 |
| 2 | 10 | 5 | (2) | 33 | 40 | 25.2 |
| 3 | 42 | 5 | (1) | 24 | 43 | 42.8 |
| 4 | 42 | 10 | (1) | 12 | 44 | 39.3 |
| 5 | 42 | 5 | (2) | 12 | 43 | 28.8 |
| 6 | 42 | 5 | (2) | 24 | 43 | 44.9 |
| 7 | 42 | 10 | (2) | 24 | 44 | 65.5 |
| 8 | 43 | 5 | (2) | 24 | 43 | 69.3 |
| 9 | 43 | 10 | (2) | 24 | 44 | 92.7 |

(1) Potassium persulfate
(2) α,α'-Azobis(alpha, gamma-dimethylvaleronitrile)
(3) See Table C
(4) %, by weight, of monomer
(5) 0.4 part (weight) per 100 parts monomer

EXAMPLE 9

The experiments in this example are identical to those of Example 7 except that the monomer mixture polymerized was 75 percent by weight of styrene and 25 percent by weight of acrylonitrile. Data therefore are shown in Table 9.

TABLE 9

Aqueous Dispersion Polymerization
75% Styrene - 25% Acrylonitrile Copolymer

| Number | Stabilizer (3) | % Stabilizer (4) | Catalyst (5) | Hrs. at 125° F. | Theoretical Solids | % Conversion |
|---|---|---|---|---|---|---|
| 1 | 20 | 10 | (1) | 24 | 32 | 81.6 |
| 2 | 22 | 5 | (1) | 24 | 31 | 87.1 |
| 3 | 23 | 5 | (1) | 24 | 31 | 87.7 |
| 4 | 23 | 5 | (2) | 24 | 31 | 85.3 |
| 5 | 24 | 5 | (2) | 24 | 31 | 81.6 |
| 6 | 24 | 10 | (2) | 24 | 32 | 91.2 |
| 7 | 43 | 10 | (1) | 24 | 32 | 75.0 |
| 8 | 46 | 5 | (1) | 21 | 31 | 91.6 |
| 9 | 46 | 5 | (2) | 21 | 31 | 98.4 |

(1) Potassium persulfate
(2) α,α'-Azobis(alpha, gamma-dimethylvaleronitrile)
(3) See Table C
(4) %, by weight, of monomer
(5) 0.4 part (weight) per 100 parts monomer While certain representative embodiments and details have been shown for the purpose of illustrating the invention it will be apparent to those skilled in this art that various changes and modifications may be made therein without departing from the spirit or scope of the invention.

What we claim is:

1. In a process for the polymerization of an ethylenically unsaturated monomer in water as the only polymerization medium and in the presence of a catalyst for the polymerization of said monomer, the improvement which comprises carrying out the polymerization in the presence of a block copolymer dispersion stabilizer which comprises at least two blocks linked by chemical valences wherein at least one of said blocks is a methoxy poly(ethylene oxide)methacrylate and at least another of said blocks is a poly(t-butyl styrene) containing pendent epoxy groups, and wherein the methoxy poly(ethylene oxide)methacrylate block comprises about 80 to about 90 percent by weight of the block copolymer and the poly(t-butyl styrene) block comprises about 10 to about 20 percent by weight of the block copolymer.

2. In a process for the polymerization of an ethylenically unsaturated monomer in water as the only polymerization medium and in the presence of a catalyst for the polymerization of said monomer, the improvement which comprises carrying out the polymerization in the presence of a block copolymer dispersion stabilizer which comprises at least two blocks linked by chemical valences wherein at least one of said blocks is a methoxy poly(ethylene oxide)methacrylate and at least another of said blocks is a poly(t-butyl styrene) containing pendent double bonds, and wherein the methoxy poly(ethylene oxide)methacrylate block comprises about 80 to about 90 percent by weight of the block copolymer and the poly(t-butyl styrene) block comprises about 10 to about 20 percent by weight of the block copolymer.

3. In a process for the polymerization of an ethylenically unsaturated monomer in water as the only polymerization medium and in the presence of a redox catalyst system consisting of sodium formaldehyde sulfoxylate, ferrous sulfate and para-menthane hydroperoxide, the improvement which comprises carrying out the polymerization in the presence of about 0.1 to about 10 percent by weight based on the weight of the monomer of a block copolymer dispersion stabilizer which comprises at least two blocks linked by chemical valences wherein at least one of said blocks is a methoxy poly(ethylene oxide)methacrylate and at least another of said blocks is a poly(t-butyl styrene) containing pendent ethylenically unsaturated bonds, and wherein the methoxy poly(ethylene oxide)methacrylate block comprises about 80 to about 90 percent by weight of the block copolymer and the poly(t-butyl styrene) block comprises about 10 to about 20 percent by weight of the block copolymer.

4. A process according to claim 3 wherein the monomer is vinyl acetate.

5. A process according to claim 3 wherein the monomer is acrylonitrile.

6. A process according to claim 3 wherein the monomer is methyl methacrylate.

7. A process according to claim 3 wherein the monomer is butadiene.

8. A process according to claim 3 wherein the monomer is an 85/15 styrene/butadiene mixture.

9. A process according to claim 3 wherein the monomer is an 85/15 acrylonitrile/styrene mixture.

10. A process according to claim 3 wherein the monomer is a 25/75 styrene/butadiene mixture.

11. A process according to claim 3 wherein the monomer is isoprene.

* * * * *

UNITED STATES PATENT AND TRADEMARK OFFICE
CERTIFICATE OF CORRECTION

PATENT NO. : 4,385,164
DATED : May 24, 1983
INVENTOR(S) : Richard G. Sinclair, David L. Berry, George E. Cremeans, Richard A. Markle, Wesley M. Germon, Jr.

It is certified that error appears in the above-identified patent and that said Letters Patent is hereby corrected as shown below:

Column 8, line 48, delete "diazobiscyclo(2.2.2)octane." and insert therefor --diazobiscyclo(2·2·2)octane.--.

Column 11, line 44, delete "1,4-diazabicyclo-(2.2.2)octane" and insert therefor --1,4-diazabicyclo-(2·2·2)octane--

Column 13, Table C, line 63, delete "PMMA" and insert therefor --PMAA--.

Column 15, Table 8, line 10, delete "85%" and insert therefor --75%--.

Signed and Sealed this

Sixteenth Day of October 1984

[SEAL]

Attest:

GERALD J. MOSSINGHOFF

Attesting Officer

Commissioner of Patents and Trademarks